(12) United States Patent
Ohta et al.

(10) Patent No.: US 8,125,743 B2
(45) Date of Patent: Feb. 28, 2012

(54) THIN-FILM MAGNETIC HEAD, MAGNETIC HEAD ASSEMBLY, MAGNETIC DISK DRIVE APPARATUS AND METHOD FOR MANUFACTURING THIN-FILM MAGNETIC HEAD

(75) Inventors: Naoki Ohta, Tokyo (JP); Kosuke Tanaka, Tokyo (JP); Takayasu Kanaya, Tokyo (JP); Kazuki Sato, Tokyo (JP); Yasufumi Uno, Tokyo (JP); Tetsuya Kuwashima, Tokyo (JP)

(73) Assignee: TDK Corporation, Tokyo (JP)

( * ) Notice: Subject to any disclaimer, the term of this patent is extended or adjusted under 35 U.S.C. 154(b) by 987 days.

(21) Appl. No.: 11/760,149

(22) Filed: Jun. 8, 2007

(65) Prior Publication Data
US 2008/0013221 A1    Jan. 17, 2008

(30) Foreign Application Priority Data
Jul. 12, 2006  (JP) .................................. 2006-191496

(51) Int. Cl.
*G11B 5/33* (2006.01)
*G11B 5/127* (2006.01)

(52) U.S. Cl. ........................................ 360/319; 360/314

(58) Field of Classification Search ................... 360/319, 360/320, 314
See application file for complete search history.

(56) References Cited

U.S. PATENT DOCUMENTS

| | | | |
|---|---|---|---|
| 6,980,403 B2 * | 12/2005 | Hasegawa | 360/319 |
| 7,375,932 B2 * | 5/2008 | Nikitin | 360/324.12 |
| 2003/0174446 A1 * | 9/2003 | Hasegawa | 360/319 |
| 2003/0179506 A1 * | 9/2003 | Shinjo | 360/319 |
| 2003/0179520 A1 * | 9/2003 | Hasegawa | 360/324.12 |
| 2004/0008454 A1 * | 1/2004 | Gill | 360/324.12 |
| 2005/0219766 A1 * | 10/2005 | Machita et al. | 360/324.1 |
| 2005/0227184 A1 * | 10/2005 | Heim et al. | 430/315 |
| 2006/0114617 A1 * | 6/2006 | Nikitin | 360/324.1 |
| 2006/0256482 A1 * | 11/2006 | Araki et al. | 360/319 |
| 2007/0035886 A1 | 2/2007 | Kagami et al. | |

* cited by examiner

*Primary Examiner* — Daniell L Negron
*Assistant Examiner* — Adam B Dravininkas
(74) *Attorney, Agent, or Firm* — Oblon, Spivak, McClelland, Maier & Neustadt, L.L.P.

(57) ABSTRACT

A thin-film magnetic head has a magnetoresistive effect read head element. The magnetoresistive effect read head element includes a lower shield layer, an upper shield layer, and a magnetoresistive effect layer formed between the lower shield layer and the upper shield layer. The magnetoresistive effect read head element also includes a lower antiferromagnetic layer. The lower antiferromagnetic layer is contacted with the lower shield layer only at an edge area of the lower shield layer.

7 Claims, 9 Drawing Sheets

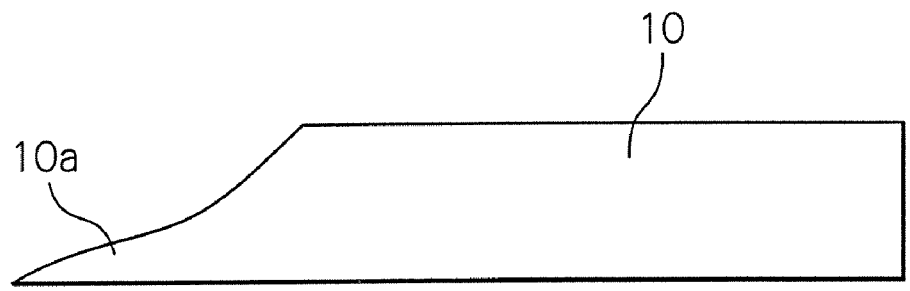
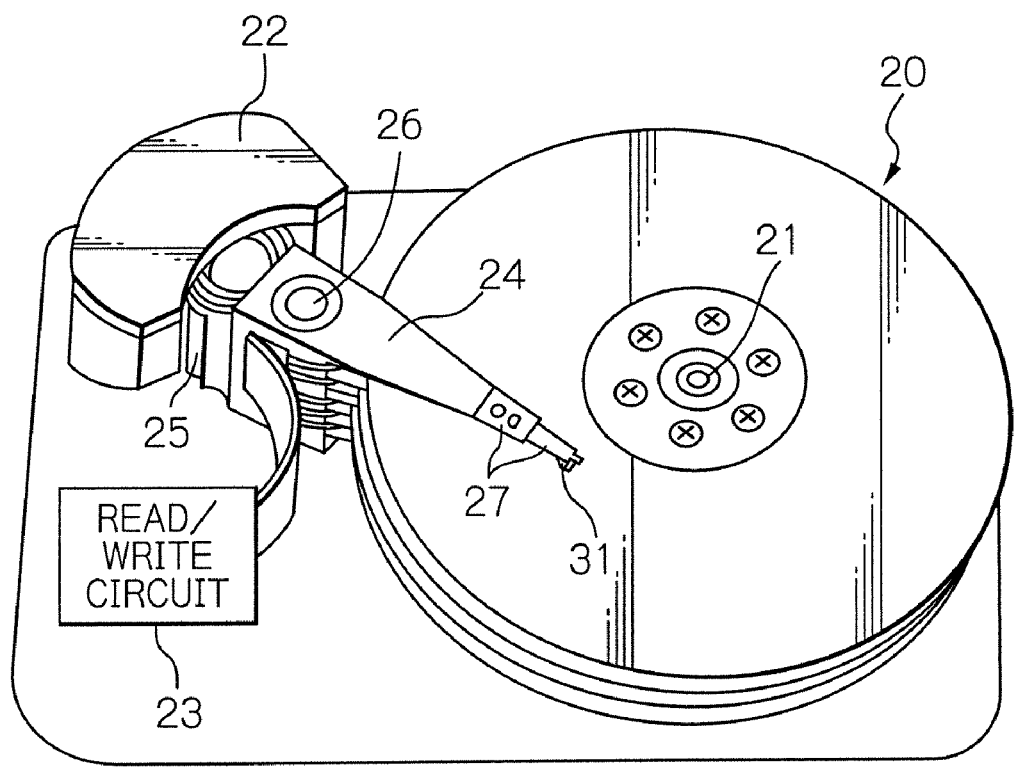

Fig. 10a1
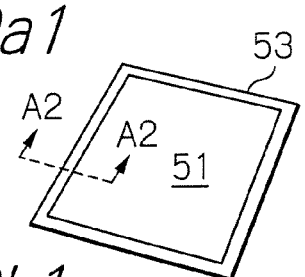
Fig. 10a2
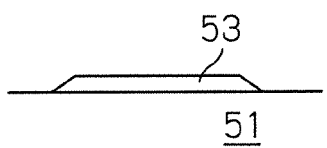
Fig. 10b1
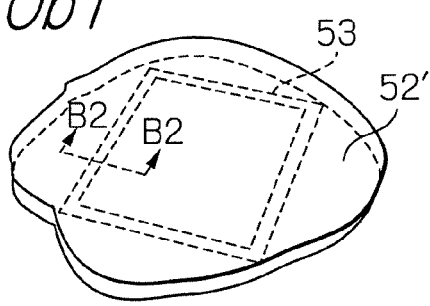
Fig. 10b2
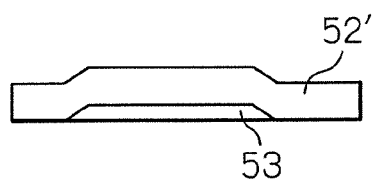
Fig. 10c1
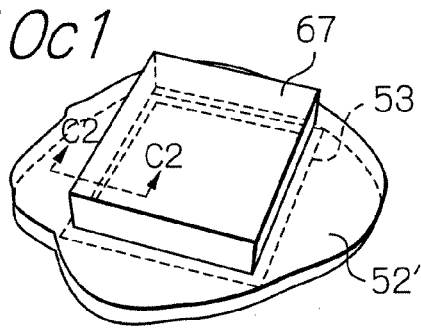
Fig. 10c2
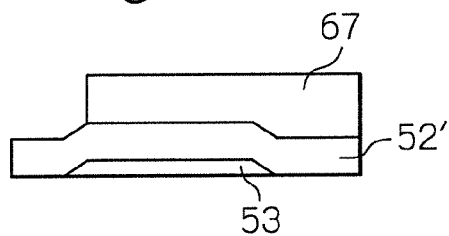
Fig. 10d1
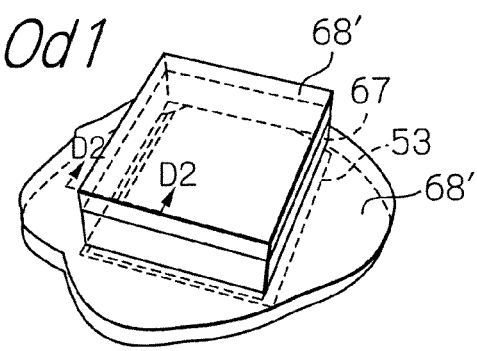
Fig. 10d2
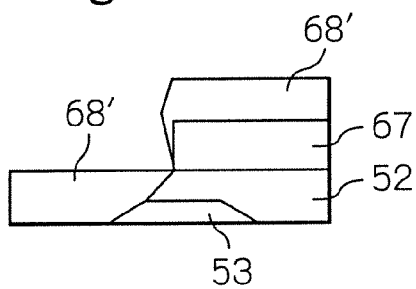
Fig. 10e1
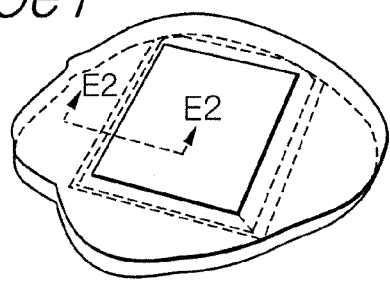
Fig. 10e2
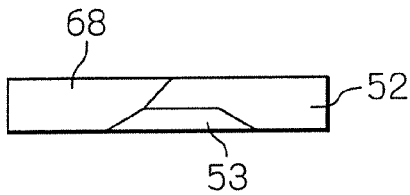

THIN-FILM MAGNETIC HEAD, MAGNETIC HEAD ASSEMBLY, MAGNETIC DISK DRIVE APPARATUS AND METHOD FOR MANUFACTURING THIN-FILM MAGNETIC HEAD

PRIORITY CLAIM

This application claims priority from Japanese patent application No. 2006-191496, filed on Jul. 12, 2006, which is incorporated herein by reference.

BACKGROUND OF THE INVENTION

1. Field of the Invention

The present invention relates to a thin-film magnetic head, a magnetic head assembly and a magnetic disk drive apparatus that have a magnetoresistive effect (MR) read head element, and method for manufacturing a thin-film magnetic head.

2. Description of the Related Art

Along with the development of high capacity and small hard disk drives (HDD), thin-film magnetic heads with high sensitivity and output are required. For this requirement, characteristic of a giant magnetoresistive head, which has a giant magnetoresistive effect (GMR) read head element, has been improved. On the other hand, a tunnel magnetoresistive head, which has a tunnel magnetoresistive effect (TMR) read head element, has been actively developed. The ratio of resistance change of TMR heads is expected to be more than double compared to the one of GMR heads.

A lower shield layer located below a MR layer and an upper shield layer located above the MR layer get thinner for a MR read head element of a thin-film magnetic head with high capacity. Thinner the lower and the upper shield layer with respect to widths of them, more magnetic fluxes are concentrated to an edge area of them. It shows the same tendency with a lower and an upper shield layers which are formed as a thin-film by plating method. However, this tendency is more apparent with a lower and an upper shield layers which are formed by ion milling after sputtering to thin the thickness, i.e. a film is formed by sputtering, and then patterning is performed by ion milling. This is because a cross-section of an edge area of a shield layer has a sharply peaked shape regardless a width and a thickness of it, if the shield layer is formed by ion milling.

FIG. 1 is a cross-section view of an edge area of a lower shield layer, which is formed as thin-film, viewed from air bearing surface (ABS) of a thin-film magnetic head.

As shown in FIG. 1, the edge area 10a of the lower shield layer 10 is skew, not perpendicular, with respect to a lamination plane, in case a film thickness of the lower shied layer 10 is thin, and the edge area 10a has a sharply peaked shape. For this reason, magnetic fields, which are applied for example from outside or a magnetic write head element, are concentrated to the edge area 10a. Unnecessary writing to a magnetic disk, which faces the thin-film magnetic head, occurs by the concentrated magnetic fields. Problem caused by the shape of the edge area of the lower and the upper shield layers to the magnetic disk is more apparent with perpendicular magnetic recording heads compared to longitudinal magnetic recoding heads.

To solve the problem caused by leaked magnetic fluxes from a thin-film magnetic head, JP patent publication 2001-6121A discloses a thin-film magnetic head, which has shunt parts at leading end area close to a magnetic disk. According to JP patent publication 2001-6121A, recoding fringe caused by leaked magnetic fluxes from a recording gap is reduced by leading leaked magnetic fluxes to the shunt parts.

However, JP patent publication 2001-6121A discloses the configuration for leading leaked magnetic fluxes from the recording gap of a magnetic write head element to shunt parts, which are provided both sides of the recording gap, but it does not disclose how to reduce the leakage of magnetic fluxes. Therefore technique disclosed in JP patent publication 2001-6121A cannot be applied to prevent the leakage of magnetic fluxes from an edge area of a lower or an upper shield layer. More specifically it is very difficult to form shunt parts near a lower and an upper shield layers of a MR read head element in terms of space. Event though shunt parts are formed, they do not reduce the leakage of magnetic fluxes from the edge areas of the lower and the upper shield layers.

SUMMARY OF THE INVENTION

It is therefore an object of the present invention to provide a thin-film magnetic head, a magnetic head assembly, a magnetic disk drive apparatus and method for manufacturing a thin-film magnetic head that prevent the leakage of magnetic fluxes from an edge area of a lower and/or an upper shield layers of a magnetic read head element.

According to the invention, a thin-film magnetic head includes a magnetoresistive effect read head element, and the magnetoresistive effect read head element includes a lower shield layer, an upper shield layer, a magnetoresistive effect layer which is formed between the lower shield layer and the upper shield layer, and a lower antiferromagnetic layer. The lower antiferromagnetic layer is contacted with the lower shield layer only at an edge area of the lower shield layer.

The lower antiferromagnetic layer is laminated such that it contacts with the lower shield layer only at the edge area of the lower shield layer. With this configuration, the edge area of the lower shield layer shows low sensitivity to magnetic fields because of antiferromagnetic exchange interaction between the edge area and the lower antiferromagnetic layer, which makes magnetic moment or spin of the edge area big. Since antiferromagnetic exchange interaction is strong around an area which is close to the lower antiferromagnetic layer, and is weaker as a distance from the lower antiferromagnetic layer is longer, the magnetic moment also distributes accordingly. That means the physical shape of the edge area of the lower shield layer is sharp, but magnetically the edge area works as if it has a round shape, not sharp. As a result, concentration of magnetic fluxes does not occur around the edge area, event though the film thickness of the lower shield layer is thin. Therefore, the leakage of magnetic fluxes from the edge area is reduced, and unnecessary writing to a magnetic disk is prevented.

Favorably, the lower antiferromagnetic layer is laminated under the edge area of the lower shield layer.

Favorably, the thin-film magnetic head further has an upper antiferromagnetic layer, and the upper antiferromagnetic layer is contacted with the upper shield layer only at an edge area of the upper shield layer. As with the lower shield layer, even though the physical shape of the edge area of the upper shield layer is sharp, the edge area of the upper shield layer works magnetically as if it has a round shape, not sharp. As a result, concentration of magnetic fluxes does not occur around the edge area in spite of thin film thickness. Therefore, the leakage of magnetic fluxes from the edge area is reduced, and unnecessary writing to a magnetic disk is prevented.

Favorably, the upper antiferromagnetic layer is laminated under the edge area of the upper shield layer.

Advantageously, the magnetoresistive effect layer has a multilayered structure, which have an antiferromagnetic layer, and a blocking temperature of antiferromagnetic material used for the lower antiferromagnetic layer is higher than one used for the antiferromagnetic layer of the magnetoresistive effect layer.

Advantageously, the thin-film magnetic head further has an inductive write head element formed on the magnetoresistive effect read head element. In this case, it is favorable that the inductive write head element is a perpendicular magnetic recording write head element.

According to the invention, a magnetic head assembly includes the thin-film magnetic head described above and a support construction, which supports the thin-film magnetic head. Here the magnetic head assembly is a mechanical and/or electrical assembly of a thin-film magnetic head or slider and a supporter of the thin-film magnetic head. The thin-film magnetic head has at least one magnetic read head element. Examples are a head gimbal assembly (HGA), a head arm assembly (HAA) and a head stack assembly (HSA). The HGA is an assembly of a magnetic head slider and a suspension. The HAA is an assembly of a magnetic head slider, a suspension and a supporting arm which support the magnetic head slider. The HAS is an assembly which a plurality of HAAs are stacked.

According to the invention, a magnetic disk drive apparatus includes one or more magnetic disks and one or more magnetic head assemblies described above.

The invention provides a method for manufacturing a thin-film magnetic head, which has a magnetoresistive effect read head element including a lower shield layer, an upper shield layer and a magnetoresistive effect layer formed between the lower shield layer and the upper shield layer. According to the invention, the method includes the steps of forming a lower antiferromagnetic layer in an area corresponding to an edge area of the lower shield layer, and forming the lower shield layer such that it contacts with the lower antiferromagnetic layer only at its edge area.

The concentration of magnetic fields is controlled by adding one step, which forms the lower antiferromagnetic layer in the area corresponding to the edge area of the lower shield layer, while the lower shield layer forming step is unchanged. In other words, by adding one easy step, it is possible to prevent the leakage of magnetic fluxes at the edge area of the lower shield layer, and it is possible to provide a thin-film magnetic head which prevents unnecessary writing to a magnetic disk.

Favorably, the lower shield layer is formed by forming a film for the lower shield layer on the lower antiferromagnetic layer, and patterning the film by milling to contact only the edge area of the lower shield layer with the lower antiferromagnetic layer. Alternatively the lower shield layer is formed using magnetic material by plating to contact only the edge area of the lower shield layer with the lower antiferromagnetic layer.

Favorably, the method further includes the steps of forming an upper antiferromagnetic layer in an area corresponding to an edge area of the upper shield layer, and forming the upper shield layer as contacting with the upper antiferromagnetic layer only at the edge area.

Favorably, the upper shield layer is formed by forming a film for the upper shield layer on the upper antiferromagnetic layer, and patterning the film by ion milling such that only the edge area of the upper shield layer contacts with the upper antiferromagnetic layer. Alternatively the upper shield layer is formed using magnetic material by plating such that only the edge area of the upper shield layer contacts with the upper antiferromagnetic layer.

Favorably, a film for the lower antiferromagnetic layer is formed while applying a magnetic field to a magnetization direction of a magnetization free layer of the magnetoresistive effect layer. In this case the method preferably has a further step of forming the magnetoresistive effect layer, which has a multilayered structure including an antiferromagnetic layer, and a film for the antiferromagnetic layer of the magnetoresistive effect layer is formed with a temperature lower than a blocking temperature of antiferromagnetic material used for the lower antiferromagnetic layer while applying a magnetic field to a magnetization direction of a magnetization fixed layer of the magnetoresistive effect layer. With this method, the magnetization direction of the lower antiferromagnetic layer is not changed while magnetizing the antiferromagnetic layer of the magnetoresistive effect layer.

BRIEF DESCRIPTION OF THE DRAWINGS

FIG. 1 is a cross-section view of an edge area of a lower shield layer, which is formed as thin-film, viewed from ABS of a thin-film magnetic head;

FIG. 2 is an oblique view schematically illustrating main components of a magnetic disk drive apparatus of the present invention;

FIGS. 10$a$1 to 10$e$1 are perspective views illustrating the process in FIG. 9; and FIGS. 10$a$2 to 10$e$2 are sectional views corresponding to FIGS. 10$a$1 to 10$e$1.

DESCRIPTION OF THE PREFERRED EMBODIMENTS

Figure 3:
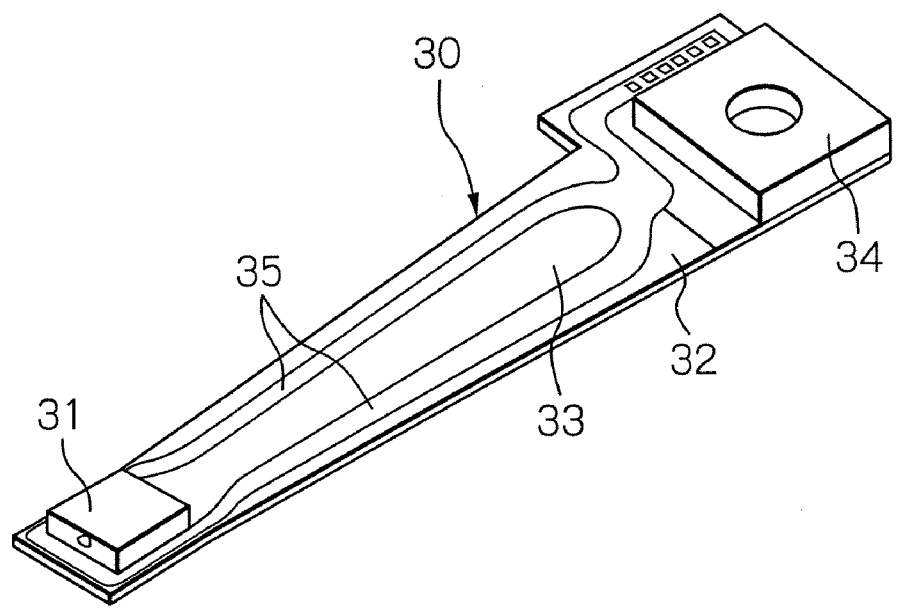
FIG. 3 is an oblique view illustrating the whole of a HGA in FIG. 2.
Figure 4:
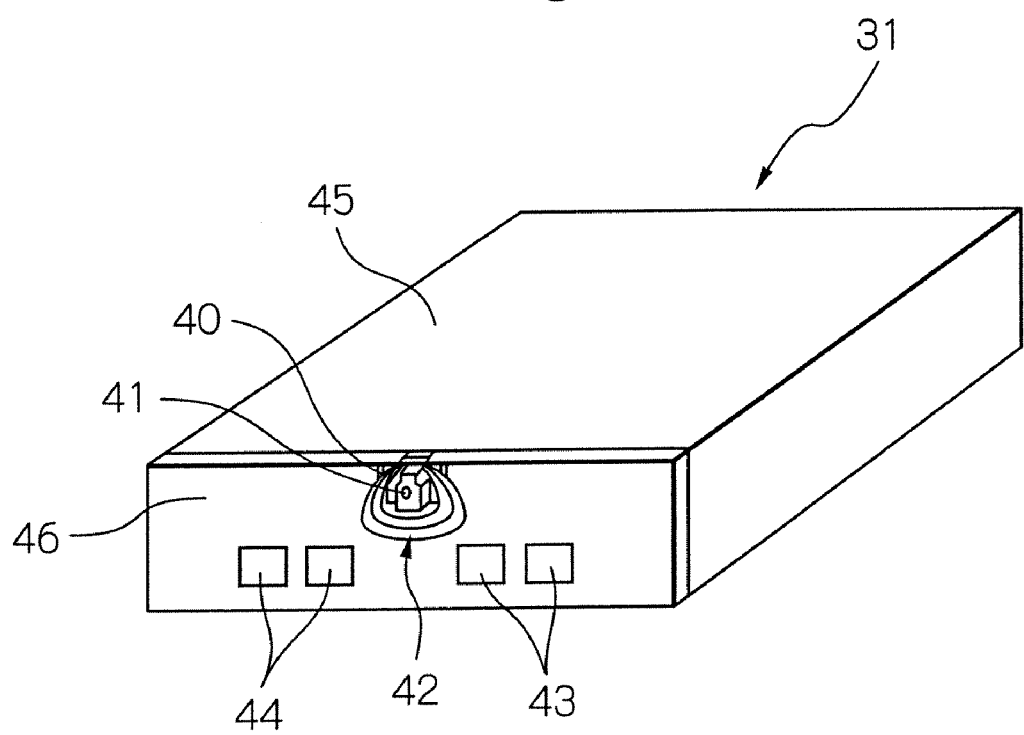
FIG. 4 is an oblique view illustrating a thin-film magnetic head fixed at a top end section of the HGA in FIG. 3.

FIG. 2 is a perspective view of main components of a magnetic disk drive apparatus in a embodiment of the present invention, FIG. 3 is a perspective view of a HGA in the embodiment, and FIG. 4 is a perspective view of a thin-film magnetic head fixed at a top end section of the HGA in FIG. 3.

In FIG. 2, reference numeral 20 denotes a plurality of magnetic disks rotating around an axis of a spindle motor 21, 22 denotes an assembly carriage device for positioning each thin-film magnetic head or slider on a track of each disk, and 23 denotes a read/write circuit for controlling read/write operations of the thin-film magnetic head, respectively.

The assembly carriage device 22 has a plurality of drive arms 24 stacked along an axis 26. These drive arms 24 are capable of rotating around the axis 26 and driven by a voice coil motor (VCM) 25. A HGA 27 is mounted on a top section of each arm 24. Each HGA 27 has a slider mounted at its top end section so that the slider opposes to one surface of each magnetic disk 20. In modifications, a single magnetic disk 20, a single drive arm 24, a single HGA 27 may be provided for a magnetic disk dive apparatus.

As shown in FIG. 3, the HGA is assembled by fixing a magnetic head slider 31 having a inductive magnetic write head element and multi-layered MR read head element to a top end section of a suspension 30, and by electrically connecting one ends of lead conductor member 35 to terminal electrodes of the thin-film magnetic head 31.

The suspension 30 is substantially constituted by a load beam 32, a resilient flexure 33 fixed on the load beam 32, a base plate 34 formed at a base end section of the load beam 32, and a lead conductor member 35 fixed on the flexure 33 and the load beam 31, and provided with trace conductors and connection pads electrically connected both ends of the trace conductors.

The suspension of the HGA according to the present invention is not limited to the aforementioned structure. Furthermore, although it is not shown, a head drive IC chip may be mounted on a middle of the suspension 30.

As shown in FIG. 4, the magnetic head slider 31 in this embodiment has a compound magnetic head element 42 which is formed by laminating a MR read head element 40 and a inductive magnetic write head element 41 each other, and four signal electrode terminals 43 and 44 electrically connected to the MR read head element 40 and a inductive magnetic write head element 41 on its element-forming surface 46, which is one of side surface in case ABS 45 is defined as a bottom. The positions of signal electrode terminals are not limited to the one shown in FIG. 4.

Figure 5:
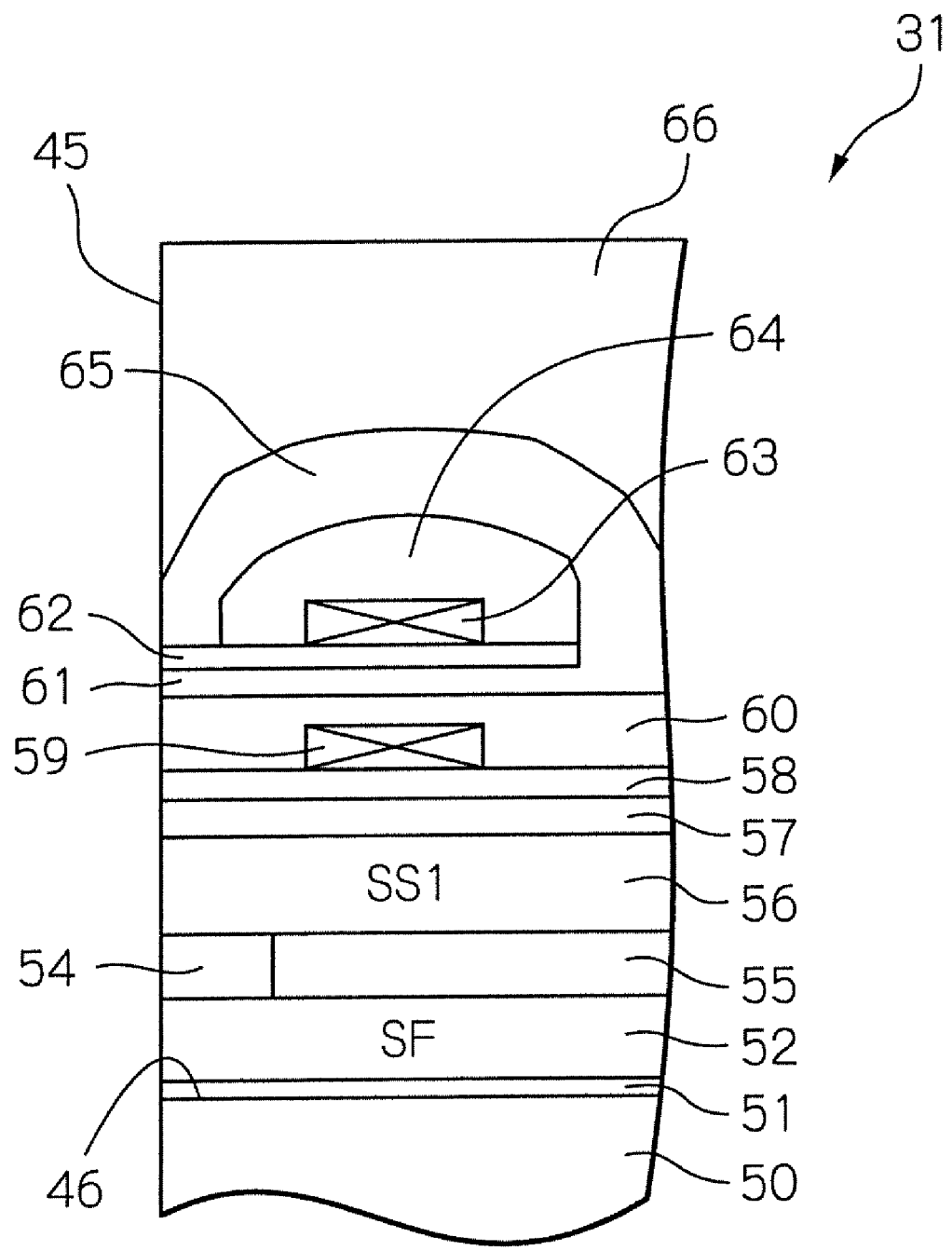
FIG. 5 is a center sectional view of the thin-film magnetic head in FIG. 4.

FIG. 5 is a center sectional view of the thin-film magnetic head in the embodiment. The embodiment shows an inductive write head element for perpendicular magnetic recording, and a TMR read head element. In case of a GMR read head element with current perpendicular to plane (CPP) structure, which uses sense current perpendicular to a film surface, the structure is basically the same, except a nonmagnetic conductor layer is formed instead of a tunnel barrier layer.

An ABS 45, which faces a magnetic disk, is formed on a slider substrate 50. The magnetic head slider 31 floats above the magnetic disk by hydrodynamic phenomenon, while in operation. A under insulation layer 51 is laminated on a element forming surface 46 of the substrate 50, and a lower shield layer 52 (SF) is laminated on the under insulation layer 51. The lower shield layer 52 is also used as a lower electrode layer.

Figure 6:
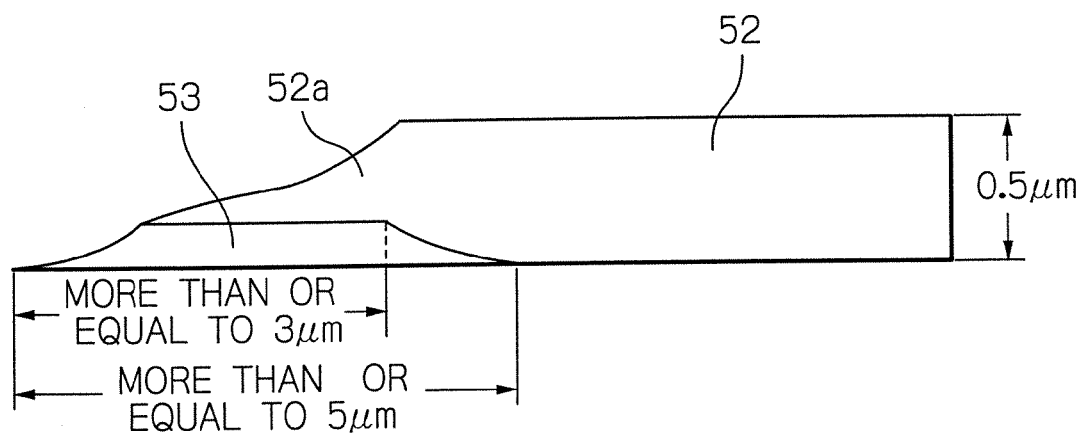
FIG. 6 is a cross-section view of an edge area of a lower shield layer and a lower antiferromagnetic layer of the thin-film magnetic head in FIG. 5 viewed from ABS of the thin-film magnetic head.
Figure 7:
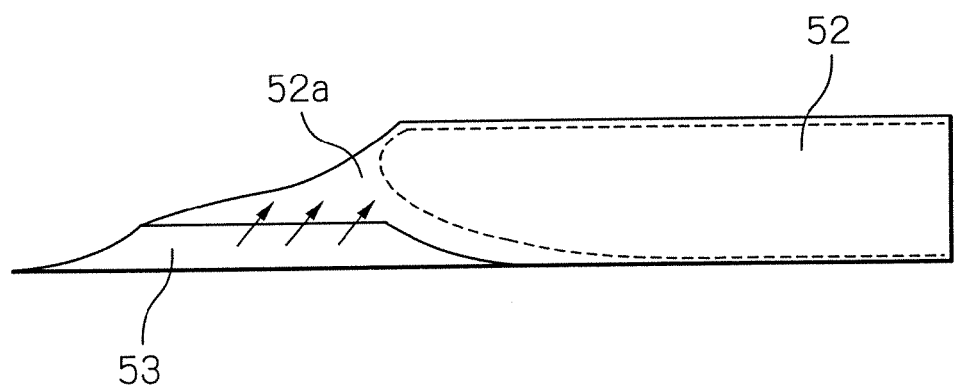
FIG. 7 is a cross-section view explaining function of the lower antiferromagnetic layer in FIG. 6.

A lower antiferromagnetic layer 53, which is shown in FIGS. 6 and 7, but not in FIG. 5, is laminated under an edge area 52a of the lower shield layer 52. More specifically, the lower antiferromagnetic layer 53 is formed under back area and both sides area of the lower shield layer 52, in case the ABS side 45 is defined as front. The lower antiferromagnetic layer 53 is formed such that it contacts with the lower shield layer only at the edge area 52a of the lower shield layer 52. A TMR multilayered structure 54 and an insulation layer 55 are laminated on the lower shield layer 52.

Figure 12:
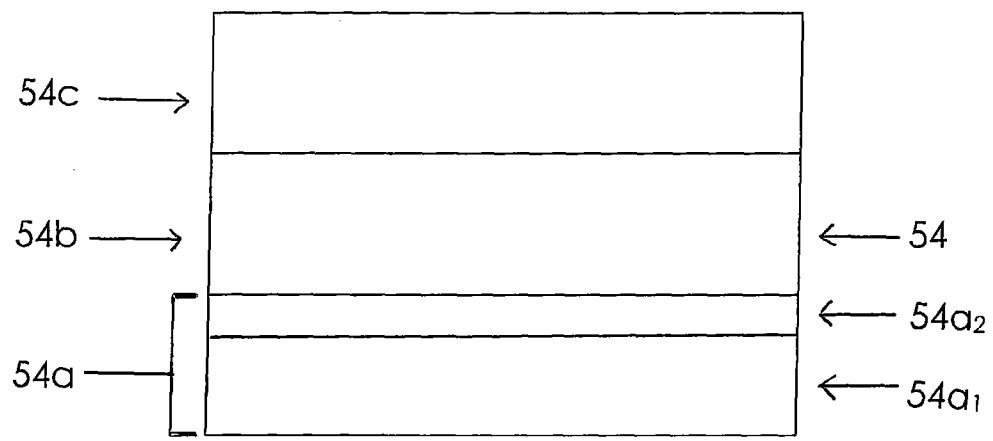
FIG. 12 is a view of a TMR multilayered structure.

As shown in FIG. 12, the TMR multilayered structure 54 has a magnetization fixed layer 54a, a tunnel barrier layer 54b and a magnetization free layer 54c. The magnetization fixed layer 54a has a pinned layer 54$a_2$ and a pinning layer 54$a_i$ made of antiferromagnetic material. It is also possible to use other structures for a TMR multilayered structure 54. Magnetic domain control layers, which is not shown, are formed on both sides of the TMR multilayered structure 54 to control magnetic domain of the free layer.

An upper shield layer 56 (SS1), which is also used as an upper electrode layer, is laminated on the TMR multilayered structure 54 and the insulation layer 55.

A TMR read head element includes the lower shield layer 52, the lower antiferromagnetic layer 53, the TMR multilayered structure 54, the insulation layer 55, the upper shield layer 56, the magnetic domain control layers and a lead conductor layer which is not shown in figures.

A nonmagnetic intermediate layer 57 that separates the TMR read head element from an inductive write head element is formed on the upper shield layer 56.

The inductive write head element, which includes an insulation layer 58, a bucking coil layer 59, a bucking coil insulation layer 60, a main magnetic pole layer 61, an insulating gap layer 62, a writing coil layer 63, a writing coil insulation layer 64 and an auxiliary magnetic pole layer 65, is formed on the nonmagnetic intermediate layer 57. A protection layer 66 is formed on the inductive write head element.

In the embodiment, especially as shown in FIG. 6, the lower antiferromagnetic layer 53 is laminated under the edge area 52a of the lower shield layer 52. The lower antiferromagnetic layer 53 is contact with the lower shield layer 52 only at the edge area 52a of the lower shield layer 52. With this configuration, the edge area 52a of the lower shield layer 52 shows low sensitivity to magnetic fields because of antiferromagnetic exchange interaction, which makes magnetic moment or spin big. Since antiferromagnetic exchange interaction is strong around an area which is close to the lower antiferromagnetic layer 53, and is weaker as a distance from the lower antiferromagnetic layer 53 is longer, the magnetic moment also distributes accordingly. That means the physical shape of the edge area 52a of the lower shield layer 52 is sharp, but magnetically the edge area 52a works as if it has a round shape, not sharp, as shown with dotted line in FIG. 7. As a result, concentration of magnetic fluxes does not occur around the edge area, the leakage of magnetic fluxes is reduced, and unnecessary writing to a magnetic disk is prevented.

Figure 11:
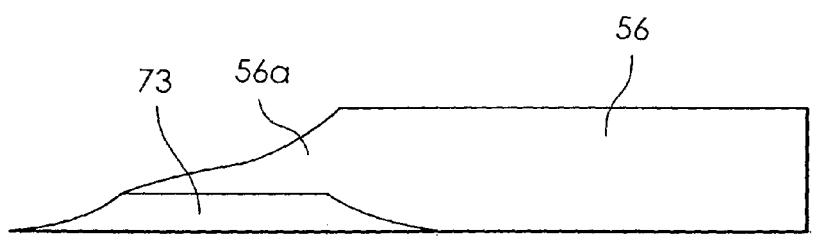
FIG. 11 is a cross-section view of an edge area of an upper shield layer and an upper antiferromagnetic layer of the thin-film magnetic head in FIG. 5 viewed from ABS of the thin-film magnetic head.

The lower anti ferromagnetic layer can be laminated on the edge area 52a of the lower shield layer 52 instead of under the edge area 52a. Further, as shown in FIG. 11, an upper antiferromagnetic layer 73, which is contacted with the upper shield layer 56 only at an edge area 56a of the upper shield layer 56, can be laminated on or under the edge area 56a of the upper shield layer 56. Further, an antiferromagnetic layer can be formed an area, which magnetic fluxes are concentrated due to its sharp shape.

It is clear that an inductive write head element for longitudinal magnetic recording can be used instead of one for perpendicular magnetic recording, which is used in the embodiment. Also it is possible to use other types of inductive write head elements for perpendicular magnetic recording than the one shown in FIG. 5.

The TMR read head element is used for the embodiment, and the GMR read head element with CPP structure can be used instead of the TMR read head element as described above. Further a GMR read head element with current in plane (CIP) structure which uses sense current parallel to a lamination plane and a anisotropic magnetoresistive effect (AMR) read head element with single layer structure can be used for the invention.

Figure 8:
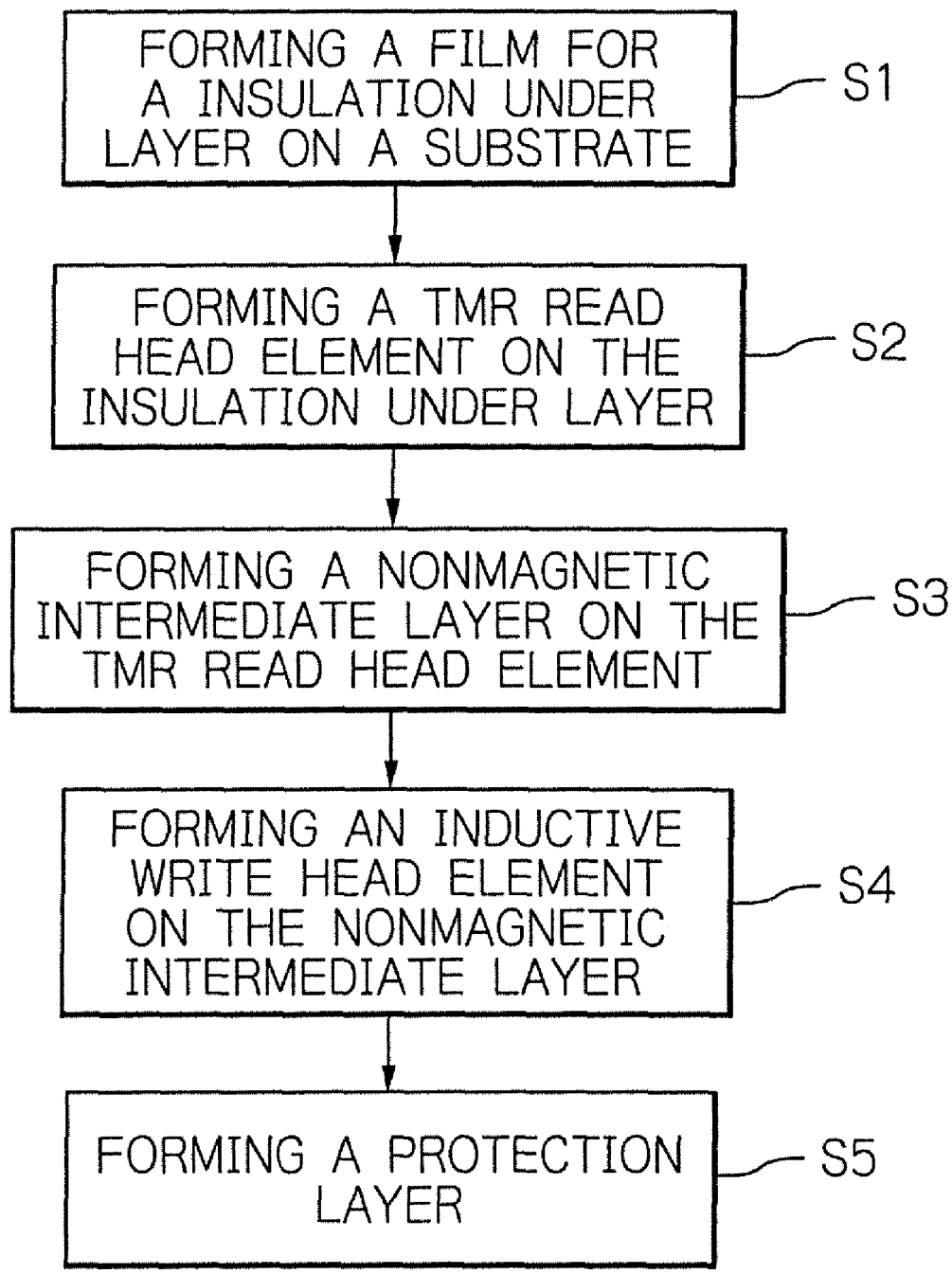
FIG. 8 is a flow chart of manufacturing process of the thin-film magnetic head in FIG. 5.

Then manufacturing process of the thin-film magnetic head is explained. FIG. 8 is a flow chart of manufacturing process of the thin-film magnetic head.

As shown in FIGS. 8 and 5, in step S1, the insulation under layer 51, which has a thickness of about 0.05 μm to 10 μm, is laminated on the substrate 50 using insulating material such as alumina ($Al_2O_3$) or oxidized silicon ($SiO_2$) by sputtering method. The substrate 50 or wafer is made of electrically conductive material such as AlTic or $Al_2O_3$—TiC.

In step S2, the TMR read head element is formed on the insulation under layer 51. The TMR read head element includes the lower shield layer 52, the lower antiferromagnetic layer 53, the TMR multilayered structure 54, the insulation layer 55, a bias layer for magnetic domain control which is not shown in figures and the upper shield layer 56. The detail of step S2 is disclosed later.

In step S3, the nonmagnetic intermediate layer 57 is formed on the TMR read head element. The nonmagnetic intermediate layer 57 has a thickness of about 0.1 μm to 0.5 μm, and is formed using insulating material such as $Al_2O_3$, $SiO_2$, aluminum nitride (AlN), diamond like carbon (DLC), and so on or metallic material such as titanium (Ti), tantalum (Ta), platinum (PT) and so on by sputtering or chemical vapor deposition (CVD).

Then in step S4, the inductive write head element, which includes the insulation layer 58, the bucking coil layer 59, the bucking coil insulation layer 60, the main magnetic pole layer 61, the insulating gap layer 62, the writing coil layer 63, the writing coil insulation layer 64 and the auxiliary magnetic pole layer 65, is formed on the nonmagnetic intermediate layer 57.

The insulation layer 58 is a layer formed by a film on the nonmagnetic intermediate layer 57 using insulating material such as $Al_2O_3$ or $SiO_2$ by sputtering, and a surface of it is planarized by chemical mechanical polishing (CMP) if needed. The bucking coil layer 59 is formed on the insulation layer 58 using conductive material such as copper (CU) by frame plating, and has a thickness of about 1 μm to 5 μm. The bucking coil layer 59 leads magnetic fluxes for writing to avoid adjacent track erasure (ATE). The bucking coil insulation layer 60 is formed such as it covers the bucking coil layer 59 using for example resist of hot cured novolac by photolithography, and has a thickness of about 0.5 μm to 7 μm.

The main magnetic pole layer 61 is formed on the bucking coil insulation layer 60. The main magnetic pole layer 61 is a flux path which leads magnetic fluxes generated by the writing coil layer 63 to perpendicular magnetic recoding layer of a magnetic disk while converging magnetic fluxes. For example, the main magnetic pole layer 61 is formed using magnetic metal material such as FeAlSi, NiFe, CoFe, NiFeCo, FeN, FeZrN, FeTaN, CoZrNb, CoZrTa by frame plating method, or is formed as multilayer film made of the magnetic metal material above, and has a thickness of about 0.5 μm to 3 μm.

The insulating gap layer 62, which is an insulating film made of such as $Al_2O_3$ or $SiO_2$, is formed on the main magnetic pole layer 61 by sputtering method. The writing coil insulation layer 64 is formed on the insulating gap layer 62 using for example resist of hot cured novolac, and has a thickness of about 0.5 μm to 7 μm. The writing coil layer 63 is formed inside of the writing coil insulation layer 64 using conductive material such as Cu by frame plating method, and has a thickness of about 1 μm to 5 μm.

The auxiliary magnetic pole layer 65 is formed as it covers the writing coil insulation layer 64 using magnetic metal material such as FeAlSi, NiFe, CoFe, NiFeCo, FeN, FeZrN, FeTaN, CoZrNb, CoZrTa by frame plating method, or is formed as multilayer film made of the magnetic metal material above, and has a thickness of about 0.5 μm to 3 μm. The auxiliary magnetic pole layer 65 is a part of return york.

Then in step S5, a protection layer 66, which is a film made of for example $Al_2O_3$ or $SiO_2$, is formed by sputtering method.

With steps described above, wafer process in the thin-film magnetic head manufacturing process completes. Remaining processes of manufacturing the thin-film magnetic head is well known, and omitted.

Figure 9:
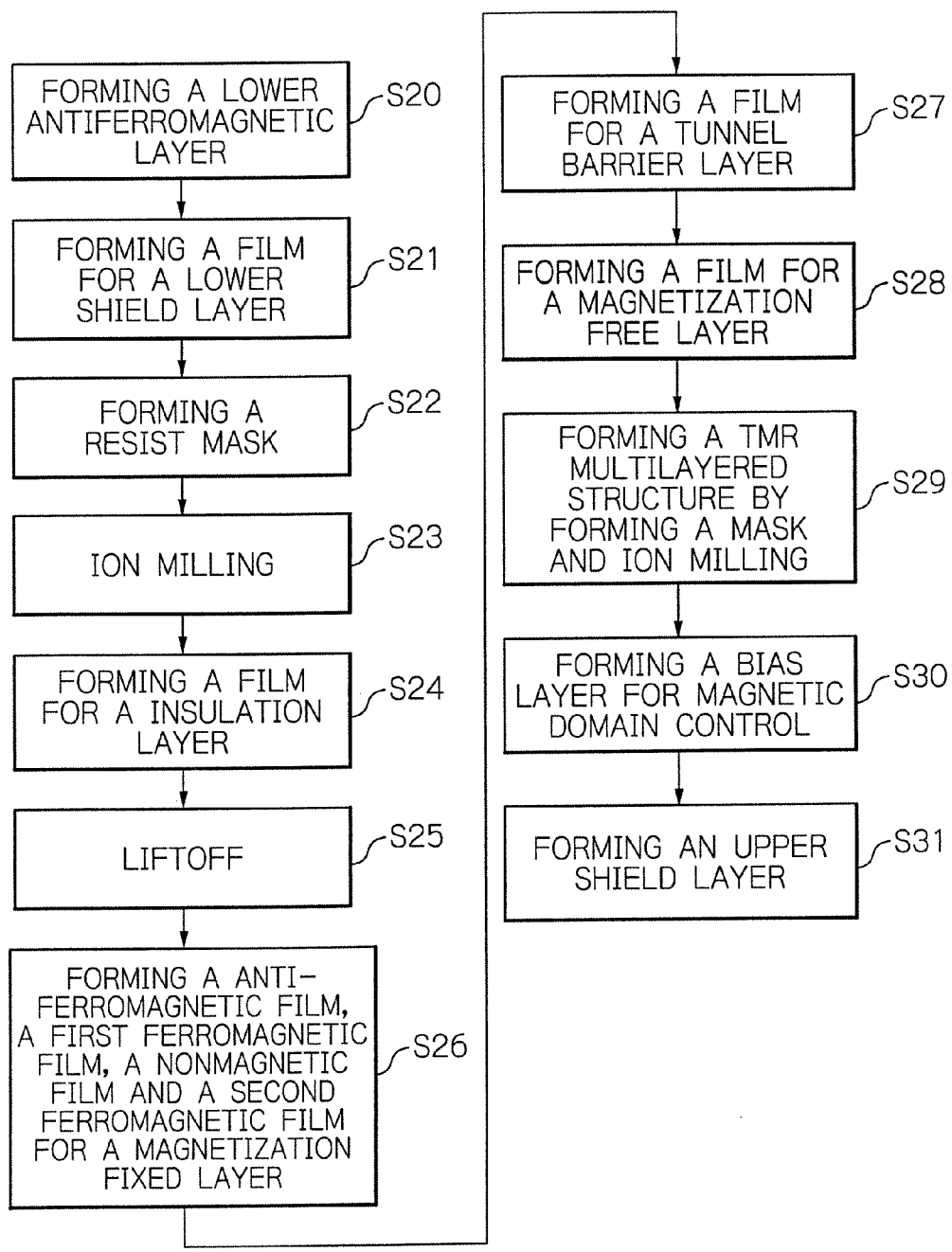
FIG. 9 is a flow chart of manufacturing process of a magnetic read head element in the manufacturing process shown in FIG. 8.

Then manufacturing process of the TMR read head element is explained. FIG. 9 is a flow chart, which shows a detail of the magnetic read head element manufacturing process among processes shown in FIG. 8. FIGS. 10a1 to 10e1 are perspective views illustrating the process shown in FIG. 9, and FIGS. 10a2 to 10e2 are sectional views corresponding to FIGS. 10a1 to 10e1 along the line A2-A2 to E2-E2.

In step S20, the lower antiferromagnetic layer 53 is formed as framing shape on the insulation under layer 51, which is shown in FIG. 5. The lower antiferromagnetic layer 53 is placed, where the edge area of the lower shield layer 52 is formed. FIGS. 10a1 and 10a2 show this state. For example, to form the lower antiferromagnetic layer 53, firstly a film is formed by sputtering method using antiferromagnetic material, then a resist mask is formed on the film, and finally ion milling is performed. For example, IrMn, PtMn, NiMn or RuRhMn can be used for the lower antiferromagnetic layer 53. Preferably, PtMn is used, because of its high blocking temperature of about 350 degrees Celsius compared to other materials above. As a example of a dimension of the lower antiferromagnetic layer 53, the length between a sharp edge side which is left extremity in FIG. 6 and right extremity of the bottom is more than or equal to 5 μm, the length between the sharp edge side which is left extremity in FIG. 6 and right extremity of the top is more than or equal to 3 μm, the depth or length for height direction is more than or equal to 3 μm, in case a film thickness of the lower shield layer 52 is 0.5 μm as shown in FIG. 6.

Film formation of antiferromagnetic material is performed with a temperature higher than a blocking temperature of the antiferromagnetic material, while applying a magnetic field in a direction parallel to ABS direction, i.e. magnetization direction of a magnetization free layer of the TMR multilayered structure, in lamination plane. For example, the temperature is above 350 degrees Celsius in case of PtMn. Fixing a magnetization direction can be performed as separate process from film formation process by magnetic field annealing.

In step S21, a film 52', which is for the lower shield layer, is formed as shown in FIGS. 10b1 and 10b2. The lower shield layer also acts as a lower electrode layer. The film 52' for the lower shield layer is formed using magnetic metal material such as FeAlSi, NiFe, CoFe, NiFeCo, FeN, FeZrN, FeTaN, CoZrNb, CoZrTa by sputtering method, and has a thickness of about 0.1 μm to 3 μm.

In step S22, a resist mask 67 for patterning the lower shield layer 52 is formed on the film 52' as shown in FIGS. 10c1 and 10c2.

In step S23, patterning of the film 52' is performed by ion milling using the resist mask 67.

In step S24, a film 68 for insulation layer is formed on it using insulation material such as $Al_2O_3$ or $SiO_2$ by sputtering method. FIGS. 10d1 and 10d2 show this state.

In step S25, the lower shield layer 52 and the insulation layer 68, which top surfaces are planarized, are completed by liftoff as shown in FIGS. 10e1 and 10e2.

The lower shield layer can be formed by frame plating method instead of sputtering and ion milling as described above.

In step S26, films for a magnetization fixed layer are formed on the lower shield layer 52 and the insulation layer 68. According to the embodiment, films for the magnetization fixed layer are synthetic type, and formed by layering an antiferromagnetic film (a film for a pinning layer), a first ferromagnetic film, a nonmagnetic film and a second ferromagnetic film sequentially by sputtering method. For example, the antiferromagnetic film is formed using IrMN, PtMn, NiMn or RuRhMn, and has a thickness of about 5 nm to 30 nm. For example, the first ferromagnetic film is formed using CoFe, and has a thickness of about 1 nm to 5 nm. For example, the nonmagnetic film is made of alloy which includes Ru, rhodium (Rh), iridium (Ir), Cr, rhenium (Re) or copper (Cu), and has a thickness of about 0.8 nm. For example, the second ferromagnetic film is formed using CoFe, CoFeSi, CoMnGe, CoMnSi or CoMnAl, and has a thickness of about 1 nm to 3 nm. Favorably, IrMn, which has a lower blocking temperature (about 250 degrees Celsius) than material of the lower antiferromagnetic layer 53, is used for the film for the pinning layer.

Film formation of antiferromagnetic material for the pinning layer is performed with a temperature higher than a blocking temperature of it, while applying a magnetic field in a direction perpendicular to ABS direction, i.e. a direction perpendicular to a magnetization direction of the free layer of the TMR multilayered structure, in a lamination plane. But it is performed with a temperature lower than a blocking temperature of the lower antiferromagnetic layer 53 (350 degrees Celsius in case of PtMn). For example, in case IrMn is used as antiferromagnetic material for the pinning layer, and PtMn is used as antiferromagnetic material for the lower antiferromagnetic layer 53, film formation for the pinning layer is performed with a temperature higher than or equal to 250 degrees Celsius, but lower than 350 degrees Celsius. The magnetization direction of the lower antiferromagnetic layer 53 is not changed with this condition. Fixing a magnetization direction can be performed as separate process from film formation process by magnetic field annealing.

In step S27, a film for the tunnel barrier layer, which has a thickness of about 0.5 nm to 1 nm, is laminated on the film for the magnetization fixed layer using oxides of aluminum (Al), titanium (Ti), Ta, Zr, Hf, magnesium (Mg), silicon (Si) or zinc (Zn).

In step S28, films for the free layer are formed on the film for the tunnel barrier layer by layering a high polarizability film and a soft magnetic film in series by sputtering method. For example, the high polarizability film has a thickness of about 1 nm, and is formed using CoFe, CoFeSi, CoMnGe, CoMnSi or CoMnAl. For example, the soft magnetic film has a thickness of about 1 nm to 9 nm, and is formed using NiFe. A magnetization direction is also controlled by applying magnetic fields while forming the film for the free layer.

In step S29, the patterning is performed for a TMR multi-layered films, which are formed with steps described above. Firstly, a mask is formed on the TMR multilayered films. The mask, which is not shown in figures, is patterned for liftoff. And then, ion milling is performed using the mask. The TMR multilayered structure 54, which has a laminated structure, is obtained by this ion milling. In the TMR multilayered structure 54, the magnetization fixed layer is placed bottom, the tunnel barrier layer is placed middle, and the free layer is placed top.

In step 30, a film, which has a thickness of about 3 nm to 20 nm, for the insulation layer is formed on it using insulation material such as Al$_2$O$_3$ or SiO$_2$ by sputtering or ion bean deposition (IBD). And then a film for the bias layer, which has a thickness of about 10 nm to 40 nm and controls magnetic domain, is formed on the film for the insulation layer by sputtering or IBD. After forming the film for the bias layer, the mask is removed in the liftoff process. With this steps, the insulation layer and the bias layer for magnetic domain control are laminated on the side surface of the TMR multilayered structure 54.

In step 31, the upper shield layer 56, which acts as an upper electrode layer, is formed on it. As with the lower shield layer 52, the upper shield layer 56 is formed using magnetic metal material such as FeAlSi, NiFe, CoFe, NiFeCo, FeN, FeZrN, FeTaN, CoZrNb, CoZrTa by sputtering method or ion milling method, and has a thickness of about 0.1 μm to 3 μm. The upper shield layer 56 can be formed by frame plating method instead of sputtering and ion milling as described above.

Each film used for a magnetic sensitive region, which includes the magnetization fixed layer, the barrier layer and the magnetization free layer, is not limited to the one described in this embodiment for the TMR multilayered structure 54, and various material and thickness can be applied to each film. For example, instead of three-layered structure which has the first ferromagnetic film, the nonmagnetic film and the second ferromagnetic film, it is possible to use single layer structure, which has a ferromagnetic film, for the magnetization fixed layer. It is also possible to use other layered number for the magnetization fixed layer. Instead of two-layered structure, single layer structure without high polarizability film can be used for the magnetization free layer. It is also possible to use three or more layered structure, which includes a film for magnetostrictive control, for the magnetization free layer. Furthermore, the magnetization fixed layer, the barrier layer and the magnetization free layer can be layered in reverse order, that is the magnetization free layer is the first, the barrier layer is the second, and the magnetization fixed layer is the last. In this case, the antiferromagnetic film in the magnetization fixed layer is placed at the top.

In the embodiment, magnetic fields are applied to fix a magnetization direction when the film for the lower antiferromagnetic layer 53 is formed. However, it is magnetized to a certain degree by just forming the film without applying the magnetic field. The upper antiferromagnetic layer, which contacts only with a edge area of the upper shield layer 56, is formed after forming the TMR multilayered structure 56. Therefore it is preferable to form the upper antiferromagnetic layer without applying the magnetic field in consideration of a blocking temperature of antiferromagnetic material for the pinning layer.

Many widely different embodiments of the present invention may be constructed without departing from the spirit and scope of the present invention. It should be understood that the present invention is not limited to the specific embodiments described in the specification, except as defined in the appended claims.

What is claimed is:

1. A thin-film magnetic head having a magnetoresistive effect read head element, the magnetoresistive effect read head element comprising:
    a substrate;
    a lower shield layer above the substrate;
    an upper shield layer above the lower shield layer, relative to the substrate;
    a magnetoresistive effect layer formed between the lower shield layer and the upper shield layer, said magnetoresistive effect layer having a pinning antiferromagnetic layer, a pinned layer, a tunnel barrier layer and a magnetization free layer;

a lower antiferromagnetic layer that is different from said pinning antiferromagnetic layer; and an upper antiferromagnetic layer formed at a back area and both side areas of the lower shield layer seen from an air bearing surface side and contacted with the upper shield layer only at an edge area of the upper shield layer to prevent a concentration of magnetic fluxes around and a leakage of magnetic fluxes from the edge area of the upper shield layer, wherein said lower antiferromagnetic layer is formed at a back area and both side areas of the lower shield layer seen from an air bearing surface side and contacted with the lower shield layer only at an edge area of the lower shield layer to prevent a concentration of magnetic fluxes around and a leakage of magnetic fluxes from the edge area of the lower shield layer, and the lower antiferromagnetic layer is laminated under the edge area of the lower shield layer.

2. The thin-film magnetic head according to claim 1, wherein the upper antiferromagnetic layer is laminated under the edge area of the upper shield layer.

3. The thin-film magnetic head according to claim 1, wherein a blocking temperature of an antiferromagnetic material used for the lower antiferromagnetic layer is higher than a blocking temperature of an antiferromagnetic material used for the pinning antiferromagnetic layer of the magnetoresistive effect layer.

4. The thin-film magnetic head according to claim 1, further comprising:

an inductive write head element formed on the magnetoresistive effect read head element.

5. The thin-film magnetic head according to claim 4, wherein the inductive write head element is for perpendicular magnetic recording.

6. A magnetic head assembly, comprising:
the thin-film magnetic head according to claim 1; and
means for supporting the thin-film magnetic head.

7. A magnetic disk drive apparatus, comprising;
a magnetic disk; and
the magnetic head assembly according to claim 6.

* * * * *